United States Patent
Luvalle

(10) Patent No.: US 9,546,886 B2
(45) Date of Patent: Jan. 17, 2017

(54) DISTRIBUTED ENVIRONMENTAL FIBER OPTIC SENSOR AND SYSTEM

(71) Applicant: OFS Fitel, LLC, Norcross, GA (US)

(72) Inventor: Michael J Luvalle, Morristown, NJ (US)

(73) Assignee: OFS FITEL, LLC, Norcross, GA (US)

( * ) Notice: Subject to any disclaimer, the term of this patent is extended or adjusted under 35 U.S.C. 154(b) by 72 days.

(21) Appl. No.: 14/705,641

(22) Filed: May 6, 2015

(65) Prior Publication Data

US 2016/0216136 A1 Jul. 28, 2016

Related U.S. Application Data

(60) Provisional application No. 62/107,813, filed on Jan. 26, 2015.

(51) Int. Cl.

| | |
|---|---|
| *G01D 5/26* | (2006.01) |
| *G01L 11/02* | (2006.01) |
| *G01K 11/32* | (2006.01) |
| G02B 6/02 | (2006.01) |
| G02B 6/12 | (2006.01) |

(52) U.S. Cl.
CPC .............. *G01D 5/268* (2013.01); *G01K 11/32* (2013.01); *G01L 11/025* (2013.01); *G01K 2011/324* (2013.01); *G02B 6/02042* (2013.01); *G02B 2006/12138* (2013.01)

(58) Field of Classification Search
CPC .............. G01D 5/268; G02B 6/02042; G02B 2006/12138; G01K 11/32; G01K 2011/324; G01L 11/025
USPC ................................................... 250/227.14
See application file for complete search history.

(56) References Cited

U.S. PATENT DOCUMENTS

| | | | | |
|---|---|---|---|---|
| 6,993,241 | B2* | 1/2006 | Bagnasco | C03C 13/046 |
| | | | | 385/142 |
| 7,257,301 | B2* | 8/2007 | Homa | C03C 13/046 |
| | | | | 385/123 |
| 7,493,009 | B2* | 2/2009 | Homa | C03B 37/01807 |
| | | | | 385/124 |

(Continued)

OTHER PUBLICATIONS

Cube Optics AG, data sheets for "Switch-Cube" 1×16 Optical Switches (3 pages).

(Continued)

*Primary Examiner* — Seung C Sohn
(74) *Attorney, Agent, or Firm* — Leo Zucker

(57) ABSTRACT

A fiber optic sensor for use in environments containing darkening agents, e.g., hydrogen. The sensor includes a multicore fiber or a fiber optic cable containing a number of optical signal paths. Each path includes a sensing core segment and one or more transmission core segments. The sensing core segment is configured to (i) produce optical perturbation signals (e.g., Raman or Rayleigh) at one or more locations along the segment, the perturbation signals corresponding to environmental conditions (e.g., temperature) sensed by the segment at a corresponding location, and (ii) allow the perturbation signals to be detected by measurement equipment coupled to the sensor when light signals from a given source excite the path. The transmission core segments in a selected path subject the perturbation signals to little if any further attenuation relative to the attenuation induced in the sensing core segments in reaction to the darkening agents.

11 Claims, 3 Drawing Sheets

(56) References Cited

U.S. PATENT DOCUMENTS

Figure 1:
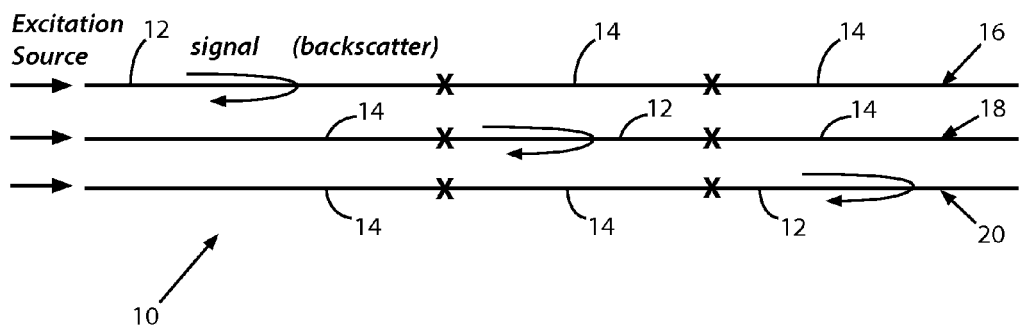

| | | |
|---|---|---|
| 7,526,160 B1 * | 4/2009 | Homa .................. G02B 6/0219 385/123 |
| 7,730,936 B2 | 6/2010 | Hernandez-Solis et al. |
| 8,401,355 B2 | 3/2013 | Homa et al. |
| 8,725,001 B2 | 5/2014 | Fini et al. |
| 8,737,792 B2 | 5/2014 | Fini et al. |
| 2012/0162693 A1 | 6/2012 | Ito |
| 2014/0036957 A1 | 2/2014 | Farhadiroushan et al. |

OTHER PUBLICATIONS

Polatis Inc., data sheets for all-optical switch products (undated).
Silixa Ltd., online advertisement for Silixa model XT-DTS(tm) distributed temperature sensor (2011).
X. Sun, et al., A multicore optical fiber for distributed sensing, Proc. SPIE 9098 (Jun. 18, 2014).
F. Suarez, et al., Developments in Heat Transfer, (InTech 2011), pp. 611-636.
G. Brown, Downhole Temperatures from Optical Fiber, Oilfield Review, v. 20, No. 4 (2009), at pp. 34-39.
OFS Fitel, LLC, Oil and Gas Distributed Temperature Sensing (DTS), one page (undated).
Tu Deft (NL), Distributed Temperature Sensing, four pages (2015).
P.S. Westbrook, et al., Integrated optical fiber shape sensor modules based on twisted multicore fiber grating arrays, Photonics West (Jul. 2014).
OFS Fitel, LLC, Application Specific Optical Fibers for Sensors, two pages (undated).
E.J. Fiebele Et Al., Development of Radiation—Hard Fiber for IFOGs, Optical Fiber Sensors, OSA Technical Digest (CD), Optical Society of America (2006).
J. Li, Fundamentals of Glass Science for Reliability for Advancing Fiber Optic Sensing to Technology, SEAFOM, Houston (Feb. 2014).
OFS Fitel, Producing Oil and Gas—GeoFibers (2012).

* cited by examiner

DISTRIBUTED ENVIRONMENTAL FIBER OPTIC SENSOR AND SYSTEM

CROSS REFERENCE TO RELATED APPLICATION

This application claims priority under 35 U.S.C. §119(e) of U.S. Provisional Patent Application No. 62/107,813 filed Jan. 26, 2015, titled "Sensor for Down-Hole Environments" which is hereby incorporated by reference in its entirety.

BACKGROUND OF THE INVENTION

Field of the Invention

The present invention relates to fiber optic cables and fibers for sensing environmental conditions such as, but not limited to, hydrogen, temperature, or pressure, at one or more locations along the cables where deployed.

Discussion of the Known Art

Fiber optic cables have been used for years in the oil and gas industries for sensing temperature, pressure, seismic activity, and gas/liquid composition at various depths inside deep boreholes. For example, single mode fibers for use in distributed temperature sensing (DTS) applications are commercially available from OFS Fitel, LLC, Norcross, Ga., as type BF05717, GEO 1310 11 NA photonic fibers, and type F21976, GEOSIL®-SM single-mode fibers. See also U.S. Pat. No. 7,730,936 (Jun. 8, 2010), disclosing a DTS cable including an upper section with electrical copper conductors for producing a controlled amount of heat, and a lower section having steel conductors to produce additional heat.

In a typical temperature sensing system, a light source illuminates a proximal or near end of a sensing cable fiber. As light from the source enters the fiber and propagates away from the source, the fiber generates backscatter signals, such as Rayleigh or Raman scattering, that travel in the opposite direction back toward the source. The backscatter signals contain so-called Stokes and Anti-Stokes components that are detected and processed by commercially available measurement equipment (e.g., Silixa model XT-DTS™). Temperature values at one or more specified locations over the length of the fiber are then determined and displayed by the equipment. See, e.g., F. Suarez et al., Developments in Heat Transfer (InTech 2011), at pages 611-36; and G. Brown, Downhole Temperatures from Optical Fiber, Oilfield Review, v. 20, no. 4 (2009), at pages 34-39.

Accordingly, an optical fiber contained in a temperature sensing cable must perform two functions, namely, (i) generate the backscatter signals in response to the light signals originating from the light source, and (ii) transmit or return the backscatter signals with enough strength so that the measurement equipment can detect the signals adequately to yield reliable temperature measurements. See, e.g., TU Delft (NL), Distributed Temperature Sensing (2015), at www.citg.tudelft.nl/?id=20298&L=1.

For details on incorporating multiple environmental sensing functionalities within a single fiber structure or "multi-core" fiber, see X. Sun et al., "A Multicore Optical Fiber For Distributed Sensing", Proc. SPIE 9098, Fiber Optic Sensors and Applications XI, 9098W (Jun. 18, 2014), published online in PDF format at www.ofsoptics.com/oil-gas-distributed-temperature-sensing.html, which is incorporated by reference. See also, U.S. Pat. No. 8,737,792 (May 27, 2014) and U.S. Pat. No. 8,725,001 (May 13, 2014); and P. S. Westbrook et al., "Integrated optical fiber shape sensor modules based on twisted multicore fiber grating arrays," Photonics West (July 2014), all of which are also incorporated by reference.

Problems arise, however, due to the fact that after most sensing fibers are exposed to so-called darkening agents in a sensed environment, the amount of attenuation that the fibers introduce to light signals propagating in them increases substantially and rapidly. Such darkening agents include, for example, high hydrogen partial pressure and ionizing radiation, one or both of which usually exist in deep boreholes and other sensed environments. High temperature (e.g., around 350 deg. C.) in sensed environments is known to accelerate hydrogen darkening, and some temperature increases may accelerate radiation darkening. See, T. Geisler et al., "Radiation performance of low bend-loss optical fiber for gyroscope applications," Position, Location, and Navigation Symposium (May 2014).

Figure 3:
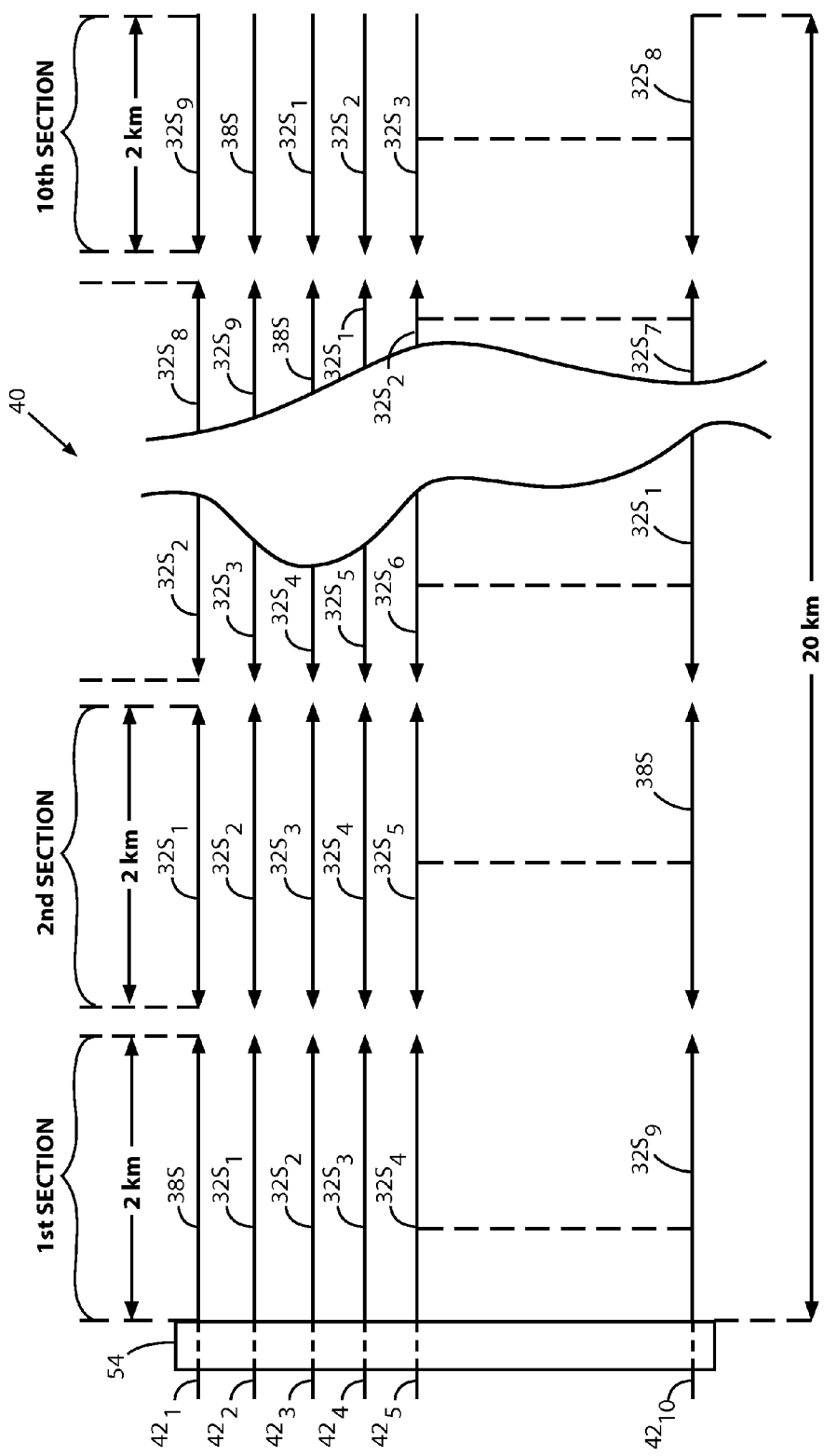

Also, most sensing fibers have cores that are doped with germanium (Ge) which makes them particularly susceptible to darkening in reaction to hydrogen. That is, it has been found that the germanium in the fiber core reacts with hydrogen in the environment to produce OH functional groups which, in turn, significantly increase fiber attenuation. See U.S. Pat. No. 8,401,355 (Mar. 19, 2013), incorporated by reference. FIG. 3 of the '355 patent and related text disclose that at 150 deg. C. and one atmosphere $H_2$ pressure, the propagation of light signals through a pure silica core fiber was substantially unaffected. By contrast, the attenuation induced in a sensing fiber with a Ge doped core under the same conditions was as much as 10 dB/km higher than that induced in the pure silica core fiber.

See, OFS, "Producing Oil and Gas," at www.Specialty-Photonics.com, and which is incorporated by reference. The hydrogen performance of fibers with pure silica and Ge doped cores was tested after the fibers were exposed to 100 psi pure hydrogen at 280 degrees C. for 350 hours. Results showed that for a multimode fiber having a pure silica core (OFS product GeoSil-MM), attenuation increased by less than 1 dB/km over the Raman band from 1014 to 1114 nm. By contrast, a multimode fiber with a Ge doped core showed an increase in attenuation of 300 dB/km at 1550 nm, and of 100 dB/km at 1060 nm. Further, the attenuation in a single mode fiber with a pure silica core (OFS product GeoSil-SM) increased by not more than 0.05 dB/km at 1550 nm under the same test conditions.

With respect to the effects of radiation on optical fibers including fibers doped with Ge, see E. J. Friebele et al., Development of Radiation-Hard Fiber for IFOGs, Optical Fiber Sensors, OSA Technical Digest (CD), Optical Society of America (2006), at www.opticsinfobase.org/abstract.cfm?URI=OFS-2006-ME2, which is also incorporated by reference.

It will therefore be understood that when darkening agents in the environment act to increase the attenuation of light signals traveling in a sensor fiber, the length of the fiber that remains useful for transmitting signals representing a sensed condition to measurement equipment many kilometers from where the signals originate in the fiber, decreases. Accordingly, there is a need for a distributed environmental sensing optical fiber or cable whose useful length is not adversely affected by darkening agents in the environments where the cable is deployed.

SUMMARY OF THE INVENTION

According to the invention, a fiber optic sensor for use in environments containing fiber darkening agents, includes a multicore fiber, or a fiber optic cable containing a number of fiber cores. The multicore fiber or cable contains a number of optical signal paths wherein each signal path includes a sensing core segment and one or more transmission core segments. The sensing core segment in each signal path is configured to (i) produce optical perturbation signals at a location along the segment in response to a sensed environmental condition at the location when light signals from an outside source are applied to the path, and (ii) allow the perturbation signals to be detected by measurement equipment when the equipment is coupled to the sensing core segment through the optical signal path. The transmission core segments in a given optical signal path are such as to introduce relatively little if any additional attenuation to the perturbation signals with respect to the attenuation introduced by the sensing core segments after the optical signal path is exposed to the darkening agents, so that the measurement equipment can detect the perturbation signals.

According to another aspect of the invention, a method of making a fiber optic sensor for use in environments containing fiber darkening agents, includes providing a multi-core fiber or a fiber optic cable containing a number of cores. At least one of the cores of the multicore fiber or the fiber optic cable is a sensing core configured to (i) produce optical perturbation signals at a location along the core that corresponds to a certain environmental condition at the location when light signals from an outside source are applied to the core, and (ii) allow the perturbation signals to be detected by measurement equipment when the equipment is coupled to the sensing core. Remaining cores in the multicore fiber or cable are transmission cores that introduce relatively little if any additional attenuation to the perturbation signals with respect to the attenuation introduced by the sensing core, after the multicore fiber or cable is exposed to the darkening agents in sensed environments.

A number of sensing core segments are formed from the sensing core, and each sensing core segment is spliced to or within a different transmission core, thus defining a number of optical signal paths in the multicore fiber or cable wherein each path includes a sensing core segment, and one or more transmission core segments that are coupled to the sensing core segment.

For a better understanding of the invention, reference is made to the following description taken in conjunction with the accompanying drawing and the appended claims.

BRIEF DESCRIPTION OF THE DRAWING FIGURES

Figure 2:
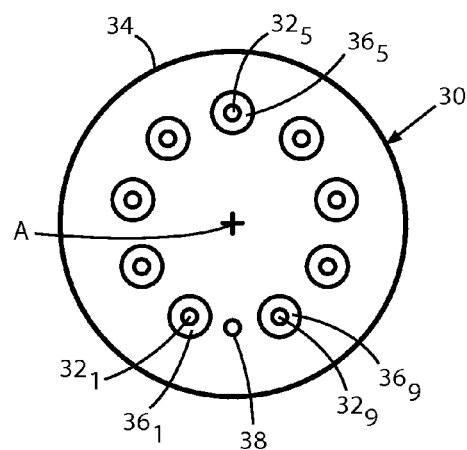
Figure 4:
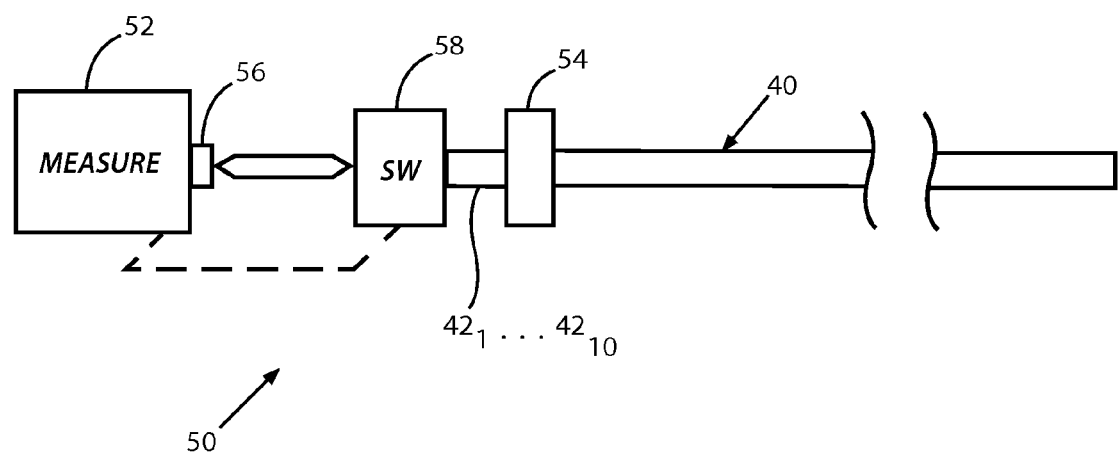

In the drawing:
FIG. 1 is a schematic diagram of a fiber optic sensor according to the invention;
FIG. 2 is a cross-section or profile of a multicore fiber or cable that can be used in the manufacture a fiber optic sensor, according to the invention;
FIG. 3 illustrates a method of manufacturing the fiber optic sensor using the multicore fiber or cable of FIG. 2, according to the invention; and
FIG. 4 is a diagram of an environmental condition sensing and measuring system according to the invention.

DETAILED DESCRIPTION OF THE INVENTION

FIG. 1 is a diagram illustrating an embodiment of a fiber optic sensor 10 according to the invention. The sensor 10 can be manufactured using either a multicore fiber structure, or a cable structure containing multiple optical fibers each having a cladded core. The sensor 10 contains condition sensing portions 12 and signal transmission portions 14, and the cores of the sensing and the transmission portions 12, 14 differ in composition from one another.

Specifically, the cores of the sensing portions 12 have a relatively high sensitivity to an environmental condition to be sensed (e.g., temperature, pressure, or chemical composition) with respect to the sensitivity of the cores of the transmission portions 14 to the same condition. As discussed above, however, the attenuation of light signals traveling through the sensing portions 12 increases substantially after the sensing portions 12 are exposed to and react with certain darkening agents in the environment.

By contrast, the attenuation of light signals traveling through the transmission portions 14 increases only slightly, if at all, with respect to the increased attenuation in the sensing portions 12 after exposure to the darkening agents. In the embodiment of FIG. 1, three different optical signal paths 16, 18, and 20 are formed in the sensor 10 by coupling (e.g., fusion splicing) one condition sensing portion 12 and two signal transmission portions 14 in series with one another and in a different order to define each path.

According to the invention, the length of each sensing portion 12 is chosen so that the portion will remain useful even after exposure to and reaction with darkening agents that exist in environments to be sensed. That is, the length of each sensing portion 12 is limited so that optical perturbation signals indicative of a sensed condition at one end of the sensing portion can propagate toward and exit from the opposite end of the sensing portion 12, with enough strength to be detected by measurement equipment coupled to the same optical signal path 16, 18, or 20 in which the sensing portion 12 is spliced.

Depending on the distance between the location along the sensor 10 where a condition is sensed, and the equipment coupled elsewhere along the sensor to measure the condition (see FIG. 4), one or more of the optical signal paths 16, 18, 20 in the sensor 10 is selected so that the sensing portion 12 in a selected path coincides with the location at which the condition is to be sensed. A given light source, which may be provided in the measurement equipment excites the selected path, and perturbation signals such as, e.g., Rayleigh or Raman backscatter are generated in the sensing portion 12 in response to the light excitation. The perturbation signals are returned to the measurement equipment, either directly from the sensing portion 12 as in signal path 16, or through one or more transmission portions 14 that are coupled to the sensing portion 12 as in the paths 18 and 20. Note that perturbation signals returned from any of the sensing portions 12 undergo relatively little attenuation when traveling to the measurement equipment through any intervening transmission portions 14. Note also that the total length of the transmission portions 14 (if any) coupled between the sensing portion 12 and the measurement equipment varies depending on the selected path.

A fiber optic sensor according to the invention can be made, for example, from a given length (e.g., 20 kilometers) of a multicore fiber 30 whose profile or cross-section is as shown in FIG. 2. In the illustrated embodiment, the multi-core fiber 30 contains ten cores disposed circumferentially and symmetrically about an axis A of the fiber 30. Nine cores $32_1, \ldots, 32_9$ are formed from, e.g., pure silica which is known to be relatively immune to darkening, especially from hydrogen. Note that if the body 34 of the multicore fiber 30 is also made of pure silica, each of the nine cores $32_1, \ldots, 32_9$ must be surrounded by a lower index cladding $36_1, \ldots, 36_9$ in order to create nine separate waveguides within the fiber 30. The tenth core 38 is of a kind used in a condition sensing fiber, for example, a Ge-doped core often used in fibers for distributed temperature sensing (DTS) applications. Persons skilled in the art will understand that instead of using the multicore fiber structure 30 in FIG. 2, the inventive sensor 10 can also be made from a fiber optic cable that contains ten individual optical fibers in a similar array as the cores in FIG. 2, wherein the cable fibers have cores that correspond to the cores $32_1, \ldots, 32_9$ and 38 in the multicore fiber 30.

According to the invention, the multicore fiber 30 (or equivalent fiber optic cable) is cleaved, for example, at nine positions every two kilometers from one end of the fiber or cable over its entire length of 20 kilometers in the present example, thereby defining ten multicore fiber or cable sections each two kilometers long. Each section therefore contains one segment 38S of the sensing core 38, and nine segments $32S_1, \ldots, 32S_9$ of the transmission cores $32_1, \ldots, 32_9$, and all of the core segments in each section are arrayed as in FIG. 2.

As depicted in FIG. 3 and starting, for example, with the first and the second cable sections among the ten defined sections, successive pairs of the sections are aligned axially to face one another so that each core segment in the first section is aligned with the same core segment in the second section. The two facing sections are then rotated about their common axis in a given sense relative to one another by $2\pi/10$ radian, so that the sensing core segment 38S in the first section is aligned with the first transmission core segment $32S_1$ in the second section, as seen in FIG. 3. Because of their symmetrical configuration, all the other core segments in the first and the second cable sections are also in an aligned condition after the $2\pi/10$ radian rotation, as shown in FIG. 3. All of the aligned core segments in the two cable sections are then fusion spliced to one another.

The above procedure is repeated for the next successive pair of cable sections. That is, the second and the third sections are aligned axially to face one another so that each core segment in the second section is aligned with the same core segment in the third section, and the facing sections are then rotated in the given sense relative to one another by $2\pi/10$ radian so that the sensing core segment 38S in the second section is aligned with the first transmission core segment $32S_1$ in the third section. The other core segments in the second and the third cable sections also become aligned with one another as seen in FIG. 3, and all of the aligned core segments in the second and the third cable sections are spliced to one another. The same procedure is repeated for the third and the fourth cable sections, the fourth and the fifth, and so on, through the ninth and the tenth cable sections.

The above process yields a fiber optic sensor cable 40 having ten optical signal paths $42_1, 42_2, \ldots, 42_{10}$, wherein the cable 40 obtains uniform distributed sensing over 20 km, even in the presence of darkening agents that substantially reduce the useful length of conventional environmental sensor cables over time.

FIG. 4 is a schematic diagram of an environmental condition sensor system 50 including the sensor cable 40 of FIG. 3, and measurement equipment 52. Assume, for example, that each of the optical signal paths $42_1, 42_2, \ldots, 42_{10}$ in the cable 40 is terminated in a single connector 54 at a proximal end of the cable 40. If all the signal paths are contained in one multicore fiber like the fiber 30 in FIG. 2, then the connector 54 may be a so-called tapered optical connector that has ten optical fibers each with an associated core, wherein each fiber is spliced to a different core at the proximal end of the multicore fiber 30.

Also assume that the equipment 52 is of a type that is commercially available and configured to obtain temperature measurements at one or more locations over a DTS fiber optic cable when connected to an equipment port 56. To enable the equipment 52 to excite selected ones of the optical signal paths $42_1, 42_2, \ldots, 42_{10}$ in the cable 40, and to process generated backscatter or other perturbation signals, a commercially available, rugged, and robust optical switch 58 having a common terminal—ten position (1×10) configuration is provided in the system 50. The switch 58 allows each optical signal path in the cable 40 to be connected to the equipment port 56 either continuously or in a determined sequence with the other signal paths, so that backscatter or other perturbation signals returned in each path can be detected for processing by the equipment 52.

The switch 58 may be a so-called optical-optical-optical or "OOO" switch available, e.g., from Cube Optics, AG in Mainz, Germany. See, www.cubeoptics.com. Suitable switches may also be available from Polatis, Inc., in Bedford, Mass. It will be understood that the measurement equipment 52 and/or the switch 58 can be configured and arranged in a known manner to cooperate with one another so that, for example, the equipment 52 excites only selected ones or all of optical signal paths in the cable 40 in a desired sequence when performing measurements.

While the foregoing represents preferred embodiments of the present invention, it will be understood by persons skilled in the art that various changes, modifications, and additions can be made without departing from the spirit and scope of the invention, and that the invention includes all such changes, modifications, and additions as are within the bounds of the following claims.

I claim:

1. A fiber optic sensor for use in environments containing fiber darkening agents, comprising:
   a length of multicore fiber or fiber optic cable;
   the multicore fiber or fiber optic cable contains a number of optical signal paths, wherein each path includes a sensing core segment and one or more transmission core segments;
   the sensing core segment in each optical signal path is configured to (i) produce optical perturbation signals at one or more locations along the segment, wherein the perturbation signals correspond to a certain environmental condition sensed by the segment at a corresponding location, and (ii) enable the perturbation signals to be detected for processing by measurement equipment coupled to the optical signal path when the path is excited by light signals from a given source; and
   the transmission core segments in the optical signal paths are such as to introduce little if any additional attenuation to light signals relative to the attenuation in the sensing core segments, after the sensor is exposed to certain darkening agents in the environment.

2. A fiber optic sensor according to claim 1, including an optical connector coupled to an end of the multicore fiber or optical cable so that perturbations associated with a sensing core segment in each optical signal path are detected by the measurement equipment when connected to the connector.

3. A fiber optic sensor according to claim 2, wherein the connector includes a number of optical fibers each of which has a core, and the fibers are spliced to corresponding cores of the multicore fiber or optical cable.

4. A fiber optic sensor according to claim 1, wherein a length of the transmission core segments coupled between a sensing core segment in the sensor and the measurement equipment varies depending on a selected optical signal path.

5. A method of making a fiber optic sensor for use in environments containing fiber darkening agents, comprising:

providing a multicore fiber, or an optical cable containing a number of fiber cores, wherein the multicore fiber or the cable contains a number of cores, and at least one of the cores is a sensing core configured to (i) produce optical perturbation signals at one or more locations along the sensing core, wherein the perturbation signals correspond to certain ambient or physical conditions sensed by the core at a corresponding location, and (ii) enable the perturbation signals to be detected by measurement equipment coupled to the sensing core for processing when light signals are applied to the sensing core from a given source;

wherein remaining cores in the multicore fiber or cable are transmission cores that introduce little if any additional attenuation relative to the attenuation in the sensing core segments after exposure to certain fiber darkening agents;

forming a number of sensing core segments from the sensing core;

splicing each sensing core segment to or within a different transmission core, thus defining a number of optical signal paths in the multicore fiber or cable wherein each optical signal path includes a sensing core segment and the total length of the transmission core segments varies depending on a selected signal path; and coupling an optical connector to each of the optical signal paths so that perturbation signals associated with the sensing core segment in a given optical signal path are detected by the measurement equipment when connected to the optical connector and light signals from the source are applied to the optical signal path.

6. A method of making a fiber optic sensor according to claim 5, wherein the cores of the multicore fiber or cable are arrayed symmetrically about an axis of the fiber or cable, and the splicing step is performed by:

cleaving the fiber or cable including the sensing and the transmission cores at determined positions along the length of the fiber or cable, thus forming confronting sections of the multicore fiber or cable wherein each section contains a sensing core segment and a number of transmission core segments; and rotating each confronting pair of sections of the fiber or cable relative to one another about the axis of the sections, so that a sensing core segment in a given section is aligned for splicing to a transmission core segment in the confronting section.

7. A method of making a fiber optic sensor according to claim 5, wherein the splicing step is performed by fusion splicing.

8. A method of making a fiber optic sensor according to claim 5, wherein the optical connector coupling step is performed by providing a connector including a number of optical fibers each of which has a core, and splicing the fibers of the connector to corresponding cores of the multicore fiber or optical cable at an end of the multicore fiber or cable.

9. A distributed environmental fiber optic sensor system, comprising:

a fiber optic sensor according to claim 2;

measurement equipment constructed and arranged to detect the perturbations produced by the sensing core segment in each optical signal path in the sensor, and to yield measurements of the environmental condition indicated by the perturbations when light signals are applied to the path; and an optical switch coupled between the connector on the fiber optic sensor and the measurement equipment;

wherein the optical switch is constructed and arranged to couple the measurement equipment to selected ones of the optical signal paths in the fiber optic sensor to detect the perturbations and to yield corresponding measurements.

10. A fiber optic sensor system according to claim 9, wherein the optical switch is an optical-optical-optical (OOO) switch.

11. A fiber optic sensor system according to claim 9, wherein the measurement equipment and the optical switch are constructed and arranged to cooperate with one another so that the equipment detects and processes perturbations that are returned through selected ones of the optical signal paths.

* * * * *